Patented May 1, 1951

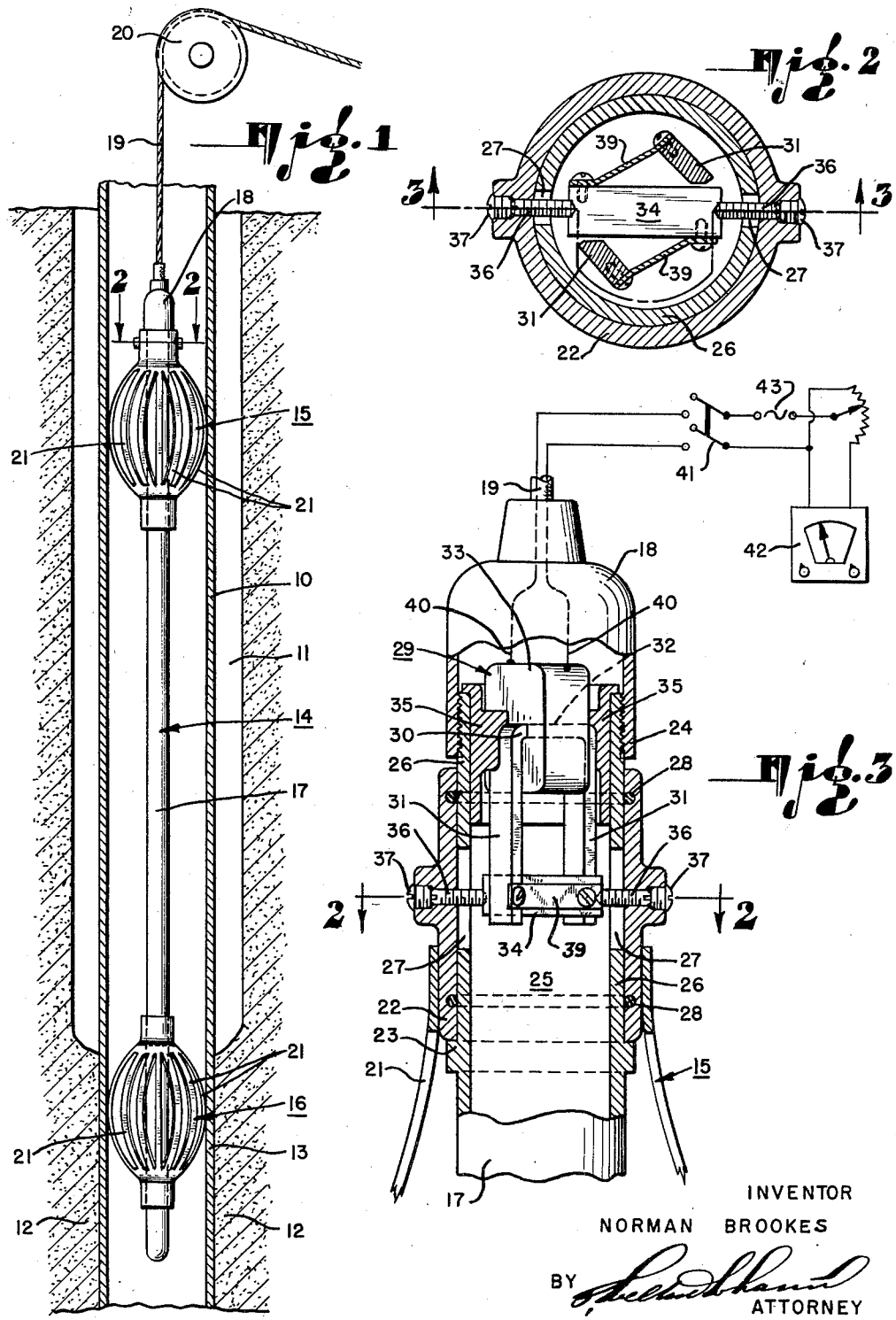

2,550,964

UNITED STATES PATENT OFFICE 2,550,964

DEVICE FOR DETERMINING POINT AT WHICH PIPE IS STUCK IN A WELL

Norman Brookes, Bakersfield, Calif., assignor to McCullough Tool Company, Los Angeles, Calif., a corporation of Nevada Application October 1, 1948, Serial No. 52,306

11 Claims. (Cl. 73—151)

My invention relates to a simple device for determining the point at which the pipe member, such as a string of tubing, drill pipe or casing, is stuck in a well, and utilizes the method disclosed in the application of Philip W. Martin, for Method and Apparatus for Determining Movability of Members in Wells, Serial No. 619,242, filed September 28, 1945 now Patent No. 2,530,308, wherein change in the relative positions of spaced portions of the tubular member in the well, when a force is applied to the upper end of tubular member, is used to produce an indication which is transmitted to the top of the well.

An important use of the invention is to quickly determine the point at which a drill pipe is stuck in a well so that the well driller may cut off the drill pipe at a point just above where it is stuck and pull the free portion of the drill pipe from the well. During the drilling of a well, various things may occur in the well which will cause the drill pipe to become stuck at some unknown point below the surface. For example, a cave-in of the walls of the well may result in the pipe being gripped so tightly that it can not be moved. Also, if circulation of mud through the well is stopped for a period of time, settlement of solids may result in a gripping of the pipe so that a portion thereof is stuck. When a lower portion of the drill pipe becomes stuck in the well, it is advisable to remove the free portion of the pipe from the well as soon as possible so as to minimize the possibility of the pipe due to delay in removing the free portion, becoming stuck at a higher level. The present invention makes it possible to quickly determine the point at which the pipe is stuck in the well, or in other words, the lowest point at which the pipe is free in the well. This quickly-obtained information makes it possible to cut off the pipe at the lowest free point thereof with minimum delay.

It is an object of the invention to provide a device for determining the stuck point, or lowest free point of a pipe in a well having a pair of spaced expansible members adapted to be lowered into the pipe in the well, these members being connected by a structure formed so as to permit relative movement of the expansible members, which relative movement, in the preferred embodiment shown herein, is rotary. When the device is lowered into the well the expansible members engage spaced portions of the tight wall. A torque is applied to the upper end of the pipe to twist the same, and the expansible members of the device rotate relatively to each other or remain stationary depending upon whether the torque applied to the upper end of the pipe has produced relative rotation of the portions of the pipe engaged by the expansible members. It will be understood that when the torque is applied to the upper end of the pipe the length of the pipe from the upper end thereof down to the stuck point will twist and that the applied torque will not twist the pipe below the stuck point. Therefore, the operator may lower the device described in the foregoing progressively down through the pipe in step-by-step order, applying a twist to the pipe as each new position of the device in the pipe is established, thereby determining in each position of the device whether or not twist applied to the upper end of the pipe has produced relative rotation of the expansible members of the device. When the device passes the stuck point and no rotation of the expansible members will occur when torque is applied to the upper end of the pipe and the operator will know that the portion of the pipe in which the device is then located is stuck, the alternative method and the operation of the device is to start the tests near the lower end of the drill pipe below the stuck point where no rotation of the expansible members of the device results when torque is applied to the upper end of the drill pipe, and carrying these tests consecutively upward until the device is brought into a position where torque applied to the upper end of the drill pipe produces relative rotation of the expansible members of the device.

It is an object of the invention to provide a device of the character described in the preceding paragraph having simple means for indicating relative rotary movement of the expansible members of the device, thereby imparting to an operator information that twist or relative rotation has occurred between the portions of the drill pipe engaged by the expansible members.

It is a further object of the invention to provide a device for determining the point at which a pipe is stuck in the well having a bar member which extends longitudinally within the pipe, this bar member having a pair of expansible cages thereon in spaced relation, at least one of these cages being turnable on the bar member. The bar member has a chamber containing an electro-responsive device which is actuated by the turning of the cage member which is turnable on the bar member and which varies an electrical characteristic or value in an electrical circuit which extends to indicating means, thereby making it possible to indicate that relative rotation of the cages has occurred. This device is lowered into the pipe which is to be tested, the expansible cages engaging spaced points vertically along the pipe. Torque is applied to the upper end of the pipe to produce a twisting force. If this twisting of the pipe produces relative rotation of the cages the operator of the device has knowledge that the portion of the pipe in which the device is located is not stuck. If, when torque is applied to the upper end of the pipe no rotation of the cages is indicated, the operator has knowledge that the device is located in the pipe at a point below the place where the pipe is frozen or stuck in the well.

Further objects and advantages of the invention will be brought out in the following part of the specification.

Referring to the drawings which are for illustrative purposes only,

Fig. 1 is a fragmentary sectional view showing a portion of a pipe which is stuck in a well, with a preferred embodiment of my invention positioned therein;

Fig. 2 is an enlarged cross section taken as indicated in line 2—2 of Fig. 1;

Fig. 3 is an enlarged fragmentary cross section of the upper end of the device of Fig. 1, taken as indicated by the line 3—3 of Fig. 2.

In Fig. 1 I show a portion of a pipe 10, such as a portion of a string of drill pipe, extending in a well bore 11. This pipe 10 has become stuck by reason of the fact that the portion 12 of the earth wall of the bore 11 has closed in around the portion 13 of the pipe 10. Within the pipe 10 I show a torsion measuring or sensing device 14 comprising a pair of expansible members 15 and 16, secured in spaced relation and so as to be capable of relative rotation by a bar member 17 which may be solid or hollow in accordance with weight requirements. At the upper end of the bar member 17 there is a cable socket 18 from which a cable 19 extends, this cable extending over a pulley 20 disposed above the top of the well.

The expansible members 15 and 16 are both spring cages comprised of bow springs 21 positioned so that they will engage the internal surface of the pipe 10 as shown in Fig. 1, and establish a condition of frictional or movement transmitting engagement between the members 15 and 16 and spaced portions of the pipe 10. The cage 16 is fixed on the lower portion of the bar member 17 and the cage 15 is rotatable on the upper portion of the bar member 17.

As shown in Figs. 2 and 3, the upper end of the cage 15 comprises a collar 22 which is rotatable on the upper portion of the bar member 17 between a shoulder 23 and the lower end of the cable socket 18 which is threaded onto the upper end of the bar member 17. In the upper end of the bar member 17 there is a chamber 25 defined by a cylindric wall 26 having diametrically opposed openings 27 therein which are covered by the collar 22 of the cage 15. Sealing means such as sealing rings 28 are provided between the upper and lower end portions of the collar 22 and the cylindric wall 26 of the chamber 25 so as to guard the openings 27 against leakage of fluid from the exterior into the chamber 25.

Within chamber 25 there is an electrical control means 29 which is responsive to rotation of the cage 15 relatively to the bar member 17 and to the cage 16 which is fixed on the lower portion of the bar member 17. In the present form of the invention this electrical control means 29 comprises a variable inductance consisting of a U-shaped field piece 30 having downwardly extending legs 31 and the cross piece 32 on which an electromagnet coil 33 is wound. Between the lower ends of the legs 31 there is a bar armature 34 occupying a diametrical position within the chamber 25, as shown in Fig. 2.

The field piece 30 is fixed to the upper portion of the cylindric wall 26 by fittings 35 and the armature 34 is connected to the collar 22 of the cage 15 so that when there is relative rotation of the cage 15 and of the bar member 17 there will be likewise relative rotation of the field piece 30 and the armature 34. Connection of the armature 34 with the collar 22 is accomplished by use of set screws 36 which are threaded through the collar 22 and project through the openings 27 in the wall 26 into engagement with the opposite ends of the armature 34 as shown in Fig. 2. Locking screws 37 are disposed at the other ends of the set screws 36 after the set screws are adjusted into proper engagement with the ends of the armature 34. The ends of the armature 34 are connected respectively to the legs 31 of the field piece 30 by non-magnetic leaf spring members 39 which yieldably hold the armature 34 in spaced relation to the lower ends of the legs 31, as shown in Fig. 2. If rotation is applied to the cage 15 while the bar member 17 is held stationary, such rotation will be transmitted through the set screws 36 to the armature 34 and cause the same to rotate on the vertical axis of the chamber 25, thereby moving the ends of the armature 34 with relation to the lower ends of the legs 31, changing the inductance of the electrical control means 29. The control means 29 is coupled with a circuit comprising conductors 40 which extend through the cable 19 to the top of the well and are connectable by switch means 41 with an indicator 42 and means 43 for electrification of the circuit, such means 43 being shown as an oscillator. A feature of the invention is in the provision of an electrified circuit having an electrical flow, one of the values or measurable characteristics of which is varied as a result of relative rotation of the cages 15 and 16. For example, an oscillating current is passed through the circuit comprising the conductors 40. Any one of the changes in its characteristics as the result of the actuation of the control means 29 may be indicated by the device 42. For example, the indicating device 42 may respond to changes in wave form, phase, power factor, frequency, amperage or voltage. The control means 29, the indicator 42, and the described parts for operatively connecting them, form an indicating means for indicating relative movement of the expansible members 15 and 16.

In the use of the device, the organization 14 is lowered into the pipe 11 and when it is brought to rest in a desired position torque is applied to the upper end of the pipe 10. This torque or twist will produce torsional deformation of all portions of the pipe 10 between its upper end and its stuck portion 13. That is to say, throughout all portions of the pipe 10 above the stuck portion 13 thereof there will be a relative rotation of adjacent annular portions of the pipe 10, and since the cages 15 and 16 are in engagement with the spaced portions of the pipe 10, as shown in Fig. 1 which will transmit motion of the engaged portions of pipe 10 to the cages 15 and 16, this relative rotation of portions of the pipe 10 in response to torque will be transmitted to the cages 15 and 16, whenever the organization 14 is positioned with at least the cage 15 above the stuck portion 13. When the organization 14 is positioned so that both cages 15 and 16 are below the stuck portion 13, the application of twist to the upper end of the pipe 10 will not produce relative rotation of the cages 15 and 16 for the reason that the application of torque to the upper end of the pipe 10 will not produce torsional deformation of the pipe 10 below the stuck portion 13 thereof. The use of the device consists simply in the taking of readings with the organization 14 in different positions within the pipe 10 and observing when two adjacent readings show a change from torsional deformation to non-torsional deformation of the pipe 10 as a result of the application of torque to its upper end, the stuck portion 13 of the pipe 10 being located between the positions of the organization 14, giving the readings referred to in the preceding sentence.

I claim:

1. In a device for determining the point at which a pipe is stuck in a well, the combination of: an assembly adapted to be lowered into the pipe, said assembly having spaced members expansible radially so as to frictionally engage the wall of the pipe and means connecting said members so that they may be relatively rotated around the axis of the pipe in response to torsional deformation of said pipe; conductors forming an electric circuit; means producing an electrification of said circuit; electrical control means connected to said members so as to be actuated in response to relative rotation of said members, said control means having parts acting to change an electrical characteristic of said electrification when there occurs relative rotation of said members; and electro-responsive indicating means coupled with said circuit, operative to indicate said change in said characteristic of said electrification and thereby indicate that there has been a relative rotation of said members.

2. In a device for determining the point at which a pipe is stuck in a well, the combination of: an assembly adapted to be lowered into the pipe, said assembly having spaced members expansible radially so as to frictionally engage the wall of the pipe and means connecting said members so that they may be relatively rotated around the axis of the pipe in response to torsional deformation of said pipe; conductors forming an electric circuit extending from the top of the well to said assembly; means producing an electrification of said circuit; electrical control means connected to said members so as to be actuated in response to relative rotation of said members, said control means having parts acting to change an electrical characteristic of said electrification when there occurs relative rotation of said members; and electro-responsive indicating means at the top of the well coupled with said circuit, operative to indicate said change in said characteristic of said electrification and thereby indicate that there has been a relative rotation of said members.

3. In a device for determining the point at which a pipe is stuck in a well, the combination of: an assembly adapted to be lowered into the pipe, said assembly having spaced members expansible radially so as to frictionally engage the wall of the pipe and means connecting said members so that they may be relatively rotated around the axis of the pipe in response to torsional deformation of said pipe; conductors forming an electric circuit; means producing an electrification of said circuit; electrical control means connected to said members so as to be actuated in response to relative rotation of said members, said control means having parts acting to change an electrical characteristic of said electrification when there occurs relative rotation of said members; and electro-responsive indicating means at the top of the well coupled with said circuit, operative to indicate said change in said characteristic of said electrification and thereby indicate that there has been a relative rotation of said members.

4. In a device for determining the point at which a pipe is stuck in a well, the combination of: an assembly adapted to be lowered into the pipe, said assembly having spaced expansible members comprising bow springs to frictionally engage the wall of the pipe and vertically extending means connecting said members so that they may be relatively rotated around the axis of the pipe in response to torsional deformation of said pipe, one of said members being rotatable relative to said vertically extending means; conductors extending in proximity to said assembly and forming an electric circuit; means producing an electrification of said circuit; electrical control means forming a part of said assembly and connected to said vertically extending means and one of said members so as to be actuated in response to relative rotation of said members, said control means having parts acting to change an electrical characteristic of said electrification when there occurs relative rotation of said members; and electro-responsive indicating means coupled with said circuit, operative to indicate said change in said characteristic of said electrification and thereby indicate that there has been a relative rotation of said members.

5. In a device for determining the point at which a pipe is stuck in a well, the combination of: an assembly adapted to be lowered into the pipe, said assembly having spaced expansible members comprising bow springs to frictionally engage the wall of the pipe and vertically extending means connecting said members so that they may be relatively rotated around the axis of the pipe in response to torsional deformation of said pipe, one of said members being rotatable relative to said vertically extending means; conductors extending in proximity to said assembly and forming an electric circuit extending from the top of the well to said assembly; means producing an electrification of said circuit; electrical control means forming a part of said assembly and connected to said vertically extending means and one of said members so as to be actuated in response to relative rotation of said members, said control means having parts acting to change an electrical characteristic of said electrification when there occurs relative rotation of said members; and electro-responsive indicating means at the top of the well coupled with said circuit, operative to indicate said change in said characteristic of said electrification and thereby indicate that there has been a relative rotation of said members.

6. In a device for determining the point at which a pipe is stuck in a well, the combination of: an assembly adapted to be lowered into the pipe, said assembly having spaced expansible members comprising bow springs to frictionally engage the wall of the pipe and vertically extending means connecting said members so that they may be relatively rotated around the axis of the pipe in response to torsional deformation of said pipe; conductors extending in proximity to said assembly and forming an electric circuit extending from the top of the well to said assembly; means at the top of the well for producing an oscillating electric current flow in said circuit; electrical control means forming a part of said assembly and connected to said members so as to be actuated in response to relative rotation of said members, said control means having a variable inductance acting to change an electrical characteristic of said electrical flow when there occurs relative rotation of said members; and electro-responsive indicating means at the top of the well coupled with said circuit comprising a meter operative to indicate said change in said characteristic of said electrical flow and thereby indicate that there has been a relative rotation of said members.

7. In a device for determining the point at which a pipe is stuck in a well, the combination of: an assembly adapted to be lowered into the pipe, said assembly having spaced expansible members comprising bow springs to engage the wall of the pipe so that said members will be moved by movement of the portions of said pipe wall engaged by said bow springs and vertically extending means connecting said members so that they may be moved relatively to each other in response to deformation of the portion of the pipe between said bow springs, one of said members being movable relative to said vertical extending means; conductors extending in proximity to said assembly and forming an electric circuit; means producing an electrification of said circuit; electrical control means forming a part of said assembly and connected to said vertically extending means and one of said members so as to be actuated in response to relative movement of said members, said control means having parts acting to change an electrical characteristic of said electrification when there occurs relative movement of said members; and electro-responsive indicating means coupled with said circuit, operative to indicate said change in said characteristic of said electrification and thereby indicate that there has been a relative movement of said members.

8. In a device for determining the point at which a pipe is stuck in a well, the combination of: an assembly adapted to be lowered into the pipe, said assembly having spaced members expansible radially so as to engage the wall of the pipe so that said members will be moved by movement of the portions of said pipe which said members engage, and means connecting said members so that they may be moved relatively to each other in response to deformation of the portion of the pipe between said members when a deforming force is applied to the pipe; conductors forming an electric circuit; means producing an electrification of said circuit; electrical control means connected to said members so as to be actuated in response to relative movement of said members, said control means having parts acting to change an electrical characteristic of said electrification when there occurs relative movement of said members; and electro-responsive indicating means coupled with said circuit, operative to indicate said change in said characteristic of said electrification and thereby indicate that there has been a relative movement of said members.

9. In a device for determining the point at which a pipe is stuck in a well, the combination of: an assembly adapted to be lowered into the pipe, said assembly having spaced members expansible radially so as to engage the wall of the pipe so that said members will be moved by movement of the portions of said pipe which said members engage, and means connecting said members so that they may be moved relatively to each other in response to deformation of the portion of the pipe between said members when a deforming force is applied to the pipe; and indicating means for indicating relative movement of said members as the result of said deformation of the pipe, said indicating means comprising one part connected to one of said members and another part connected to the other of said members so that there will be relative movement of said parts as the result of relative movement of said members, and means adapted to respond to relative movement of said parts and including means for registering said last named relative movement as an indication that there has been deformation of said portion of the pipe.

10. In a device for determining the point at which a pipe is stuck in a well, the combination of: an assembly adapted to be lowered into the pipe, said assembly having spaced expansible members comprising bow springs to engage the wall of the pipe so that said members will be moved by movement of the portions of said pipe wall engaged by said bow springs and vertically extending means connecting said members so that they may be moved relatively to each other in response to deformation of the portion of the pipe between said bow springs, one of said members being movable relative to said vertical extending means; and indicating means for indicating relative movement of said members as the result of said deformation of the pipe, said indicating means comprising one part connected to one of said members and another part connected to the other of said members so that there will be relative movement of said parts as the result of relative movement of said members, and means adapted to respond to relative movement of said parts as an indication that there has been deformation of said portion of the pipe.

11. In a device for determining the point at which a pipe is stuck in a well, the combination of: an assembly adapted to be lowered into the pipe, said assembly having spaced members expansible radially so as to engage the wall of the pipe so that said members will be moved by movement of the portions of said pipe which said members engage, and means connecting said members so that they may be relatively rotated around the axis of the pipe in response to torsional deformation of said pipe; and indicating means for indicating relative rotation of said members as the result of said deformation of the pipe, said indicating means comprising one part connected to one of said members and another part connected to the other of said members so that there will be relative movement of said parts as the result of relative rotation of said members, and means adapted to respond to relative movement of said parts as an indication that there has been deformation of said portion of the pipe.

NORMAN BROOKES.

REFERENCES CITED

The following references are of record in the file of this patent:

UNITED STATES PATENTS

| Number | Name | Date |
|---|---|---|
| 1,654,819 | Kinley | Jan. 3, 1928 |
| 2,078,426 | Sweet | Apr. 27, 1937 |
| 2,170,527 | Culbertson | Aug. 22, 1939 |
| 2,219,512 | Cooper et al. | Oct. 29, 1940 |
| 2,277,110 | Johnson | Mar. 24, 1942 |
| 2,300,384 | Johnston | Oct. 27, 1942 |

OTHER REFERENCES

Publication—"Instruments," vol. 20, July 1947, p. 638.